(12) United States Patent
Andersen et al.

(10) Patent No.: US 7,997,546 B1
(45) Date of Patent: Aug. 16, 2011

(54) MOUNTING ASSEMBLY FOR TRAFFIC CAMERAS AND OTHER TRAFFIC CONTROL DEVICES

(75) Inventors: Gordon Andersen, Edmond, OK (US);
A. Philip Parduhn, Edmond, OK (US);
Raymond M. Woods, Edmond, OK (US)

(73) Assignee: Pelco Products, Inc., Edmond, OK (US)

( * ) Notice: Subject to any disclaimer, the term of this patent is extended or adjusted under 35 U.S.C. 154(b) by 646 days.

(21) Appl. No.: 12/111,400

(22) Filed: Apr. 29, 2008

Related U.S. Application Data (60) Provisional application No. 60/916,351, filed on May 7, 2007.

(51) Int. Cl.
*A47B 96/06* (2006.01)

(52) U.S. Cl. .................. 248/214; 248/219.4; 248/230.8; 248/292.14

(58) Field of Classification Search .................. 248/214, 248/218.4, 219.4, 229.17, 230.8, 230.9, 291.1, 248/292.14; 362/431
See application file for complete search history.

(56) References Cited

U.S. PATENT DOCUMENTS

| | | | |
|---|---|---|---|
| 1,682,693 A | 8/1928 | Day |
| 1,985,951 A | 1/1935 | Rickterkessing |
| 2,038,117 A | 4/1936 | Layton |
| 2,124,006 A | 7/1938 | Parker |
| 2,498,590 A | 2/1950 | Strauss |
| 2,942,366 A | 6/1960 | Pfaff et al. |
| 3,142,501 A | 7/1964 | Clark et al. |
| 3,888,446 A | 6/1975 | O'Brien et al. |
| 3,917,205 A | 11/1975 | Meadors |
| 4,101,191 A | 7/1978 | Gould et al. |
| 4,142,173 A | 2/1979 | Gould et al. |
| 4,148,456 A | 4/1979 | Garchinsky |
| 4,167,033 A | 9/1979 | Fletcher |
| 4,447,750 A | 5/1984 | Howlett et al. |
| 4,460,142 A | 7/1984 | O'Rorke |
| 4,489,910 A | 12/1984 | Ferguson |
| 4,659,046 A | 4/1987 | Parduhn |
| 4,691,884 A | 9/1987 | Parduhn |
| 4,860,985 A | 8/1989 | Olson et al. |
| 4,917,338 A | 4/1990 | Olson et al. |
| 5,069,416 A | 12/1991 | Ennis |
| 5,105,350 A | 4/1992 | Tolman et al. |
| D328,243 S | 7/1992 | Parduhn |
| D335,279 S | 5/1993 | Parduhn |
| 5,299,111 A | 3/1994 | Parduhn et al. |
| 5,299,773 A | 4/1994 | Bertrand |
| 5,340,069 A | 8/1994 | Niemeyer |
| 5,504,481 A | 4/1996 | Wys |
| D373,947 S | 9/1996 | Parduhn |
| D379,756 S | 6/1997 | Parduhn |

(Continued)

*Primary Examiner* — Gwendolyn Baxter
(74) *Attorney, Agent, or Firm* — Mary M. Lee (57) ABSTRACT

A mounting assembly for supporting a traffic camera or other traffic control device high above traffic. The assembly includes a conventional camera bracket, a vertical pole of at least two inches in diameter, an adapter for attaching the camera bracket to the top of the pole, and a mounting bracket for attaching the pole to the mast arm or other support. The bracket includes an adapter plate by which the pole can be rotated relative to the support so the camera can be mounted on either a vertical or a horizontal support structure. The bracket also includes a clamp that attaches to the support structure by a three point attachment. This versatile mounting assembly can support a traffic control device 10-15 feet above the mast arm or other support, without significant movement of the pole relative to the bracket or of the bracket relative to the support.

28 Claims, 10 Drawing Sheets

U.S. PATENT DOCUMENTS

| | | |
|---|---|---|
| 5,645,255 A | 7/1997 | Parduhn |
| 5,865,406 A | 2/1999 | Teeple |
| 5,964,444 A * | 10/1999 | Guertler ........................ 248/548 |
| 6,204,446 B1 | 3/2001 | Parduhn |
| 6,357,709 B1 | 3/2002 | Parduhn |
| 7,258,314 B1 | 8/2007 | Parduhn et al. |
| 7,523,912 B1 | 4/2009 | Woods |
| 7,601,928 B1 | 10/2009 | Magness et al. |

* cited by examiner

MOUNTING ASSEMBLY FOR TRAFFIC CAMERAS AND OTHER TRAFFIC CONTROL DEVICES

This application claims the benefit of provisional application Ser. No. 60/916,351, filed May 7, 2007, entitled "Mounting Assembly for Traffic Cameras and Other Traffic Control Devices," the contents of which are incorporated herein by reference.

FIELD OF THE INVENTION

The present invention relates generally to brackets for mounting traffic cameras and other traffic control devices to poles and mast arms.

BACKGROUND OF THE INVENTION

Use of cameras to record traffic activity is increasing. Typically cameras are supported on top of vertical poles or pipes, and the lower end of the supporting pole is mounted to a mast arm by a bracket assembly of some sort. In many cases, the optimum height for the camera is 10-15 feet above the support. However, using conventional mounting brackets, the maximum height of the camera is about six feet. This is due to the moment capacity limitations of the bracket and the resulting tendency of the camera and bracket to rotate on the mast arm in response to high wind loads.

There are several other devices that are mounted higher than six feet above the support. These include antennas, sensors, monitors, signs, junction boxes, wireless devices, and microwave transmission devices. Thus, there is a need for a mounting bracket that is capable of supporting such traffic control devices high above the standard mast arm or pole.

Cameras and other traffic control devices may be supported on vertical supports, such as traffic and utility poles. Alternately, these devices are mounted on a mast arm or other horizontally extending support. Therefore, there is also a need for a bracket that can be used alternately on horizontal and vertical supports.

DETAILED DESCRIPTION OF THE PREFERRED EMBODIMENTS

Figures 1, 2:
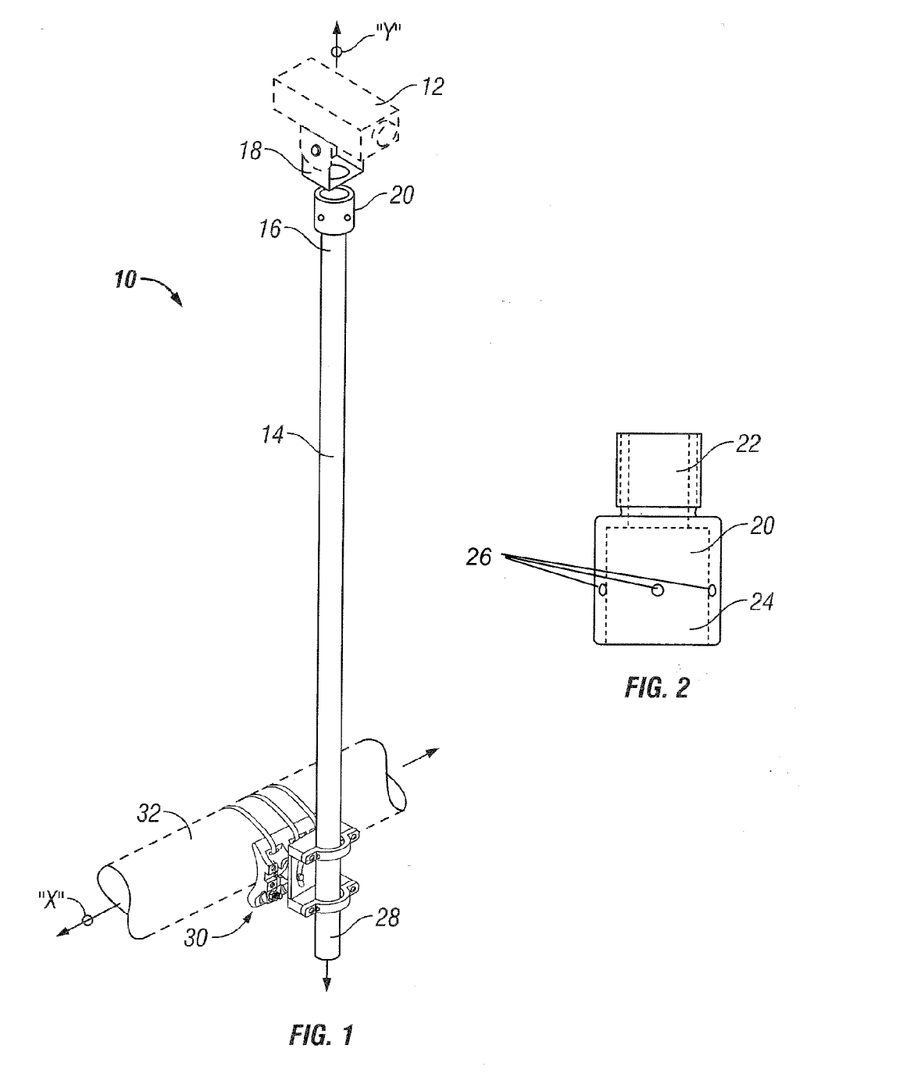
FIG. 1 is a perspective view of a mounting assembly constructed in accordance with a preferred embodiment of the present invention. The assembly is supporting a traffic camera high above a mast arm.
FIG. 2 is a side elevational view of the camera bracket adapter.

Turning now to the drawings in general and to FIG. 1 in particular, there is shown therein a mounting assembly made in accordance with a preferred embodiment of the present invention and designated generally by the reference numeral 10. As shown, the assembly 10 supports a traffic control device, such as a traffic camera 12. However, the assembly 10 is suitable for supporting a variety of other traffic control devices that need to be mounted at elevated positions. As used herein, traffic control device may include cameras, antennas, sensors, monitors, signs, junction boxes, wireless devices, microwave transmission devices, and any other device useful in the monitoring or control of pedestrian or vehicular traffic.

The camera 12 is mounted on a support pole 14. Preferably, the support pole 14 is a metal tube or pipe having a diameter of at least 2 inches, and more preferably an outer diameter of 2⅜ inches. Though the length of the pole 14 may vary, the pole preferably is at least 6 feet long. More preferably, the pole 14 is at least 8 feet long and, most preferably, the pole is at least 10 feet long.

The first or upper end 16 of the pole 14 attaches to a device bracket, which may be a conventional camera bracket 18, not shown or described in detail. The bracket 18 adjustably supports the camera or other device 12. More specifically, the bracket 18 supports the camera 12 for rotation in both a vertical axis and a horizontal axis, as this will allow the camera to be directed to a specific view area.

Since the base of the typical camera bracket is sized to fit a smaller diameter pole, the assembly 10 ideally includes an adapter 20 interposed between the first end 16 of the pole 14 and the base of the camera bracket 18. As shown in FIG. 2, the upper portion 22 of the adapter 20 is cylindrically shaped and sized to fit inside the base of the camera bracket 18. The lower section 24 of the adapter 20 is also cylindrically shaped, but has a larger diameter to fit over the first end 16 of the pole 14. Screws (not shown) are threaded through threaded openings 26 in the side of the lower section 24 to secure the adapter 20 to the pole 14.

Figure 3:
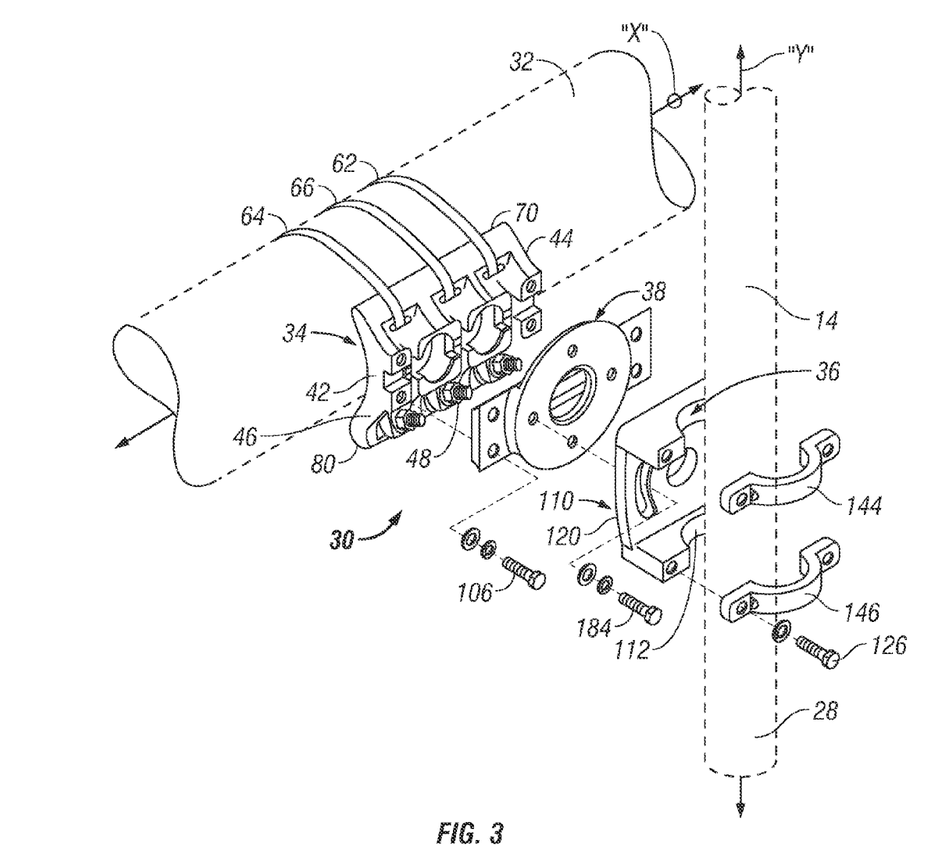
FIG. 3 is an enlarged, exploded perspective view of a mounting bracket in accordance with a first preferred embodiment.
Figure 4:
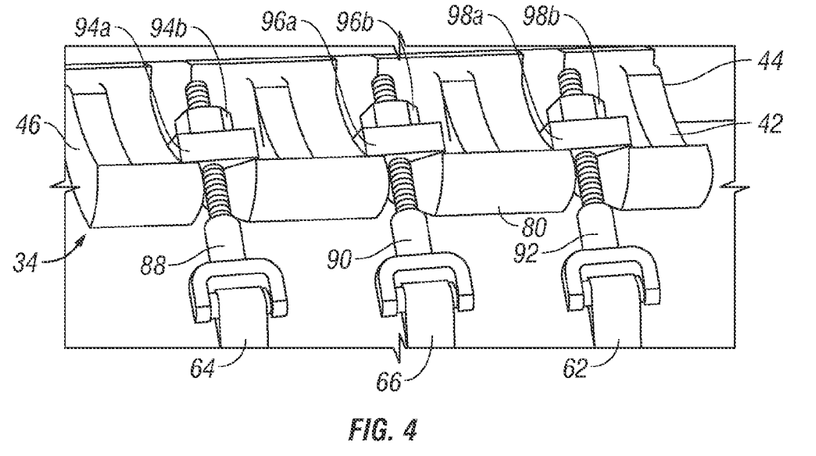
FIG. 4 is an enlarged perspective view of the side of the first clamp showing the band screw attachment.

Referring again to FIG. 1 and now also to FIG. 3, the second end 28 of the pole 14 is supported by a mounting bracket 30 on an elongate support, such as a mast arm 32 as shown. The mounting bracket 30 generally comprises a first clamp 34 that is removably attachable to the mast arm 32, and a second clamp 36 that is removably attachable to the second end 28 of the pole 14. Interposed between the first and second clamps 34 and 36 is an adapter plate 38 by which the second clamp 36 is adjustably attachable to the first clamp 34, in a manner described below.

Figure 5:
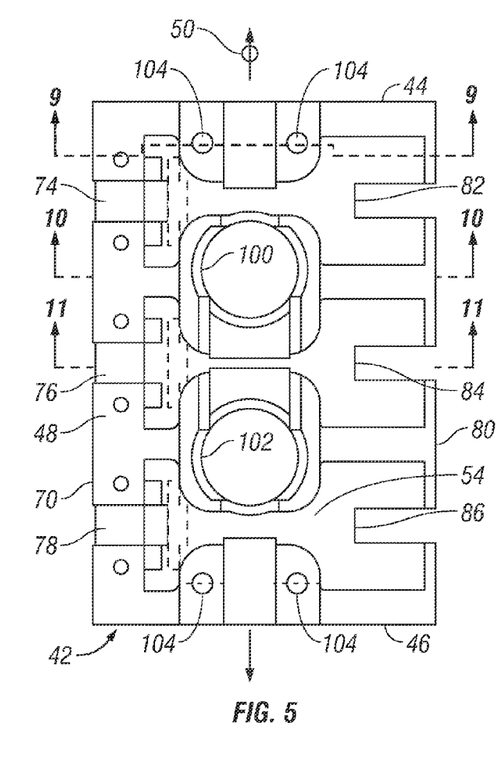
FIG. 5 is a plan view of the first clamp body.
Figure 6:
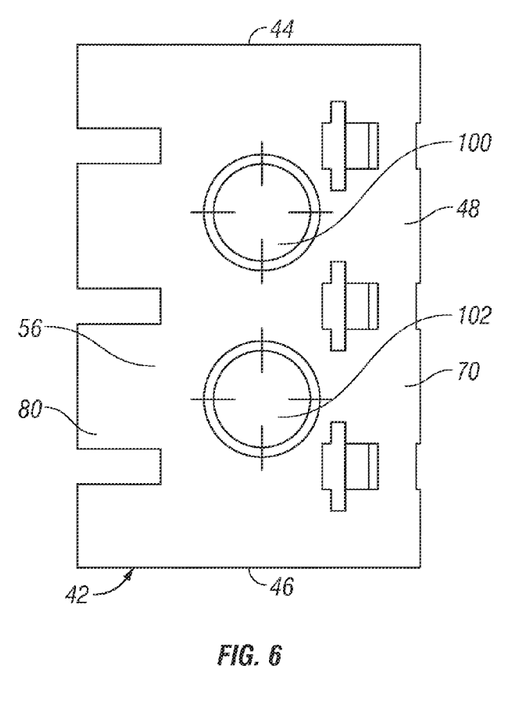
FIG. 6 is a bottom view of the first clamp body.
Figure 7:
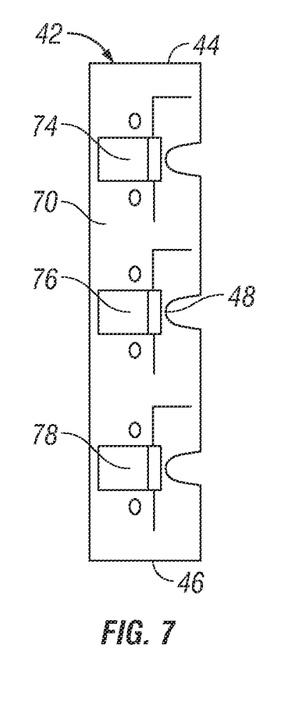
FIG. 7 is an elevational view of one side of the first clamp body.
Figure 8:
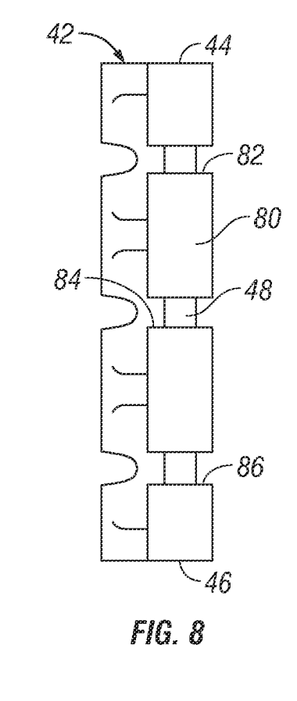
FIG. 8 is an elevational view of the other side of the first clamp body.
Figure 9:
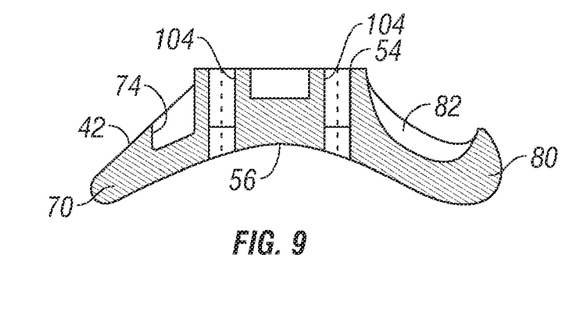
FIG. 9 is a cross-sectional view of the first clamp body taken along line 9-9 in FIG. 5.
Figure 10:
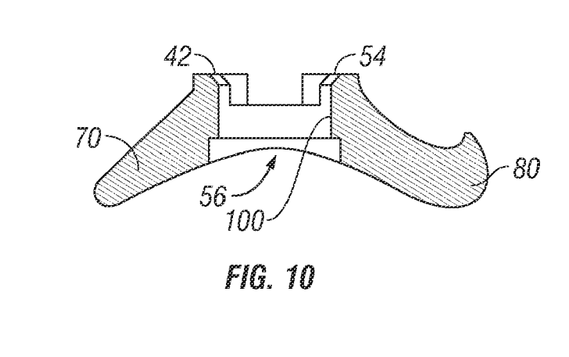
FIG. 10 is a cross-sectional view of the first clamp body taken along line 10-10 in FIG. 5.
Figure 11:
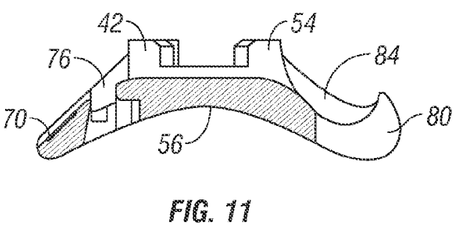
FIG. 11 is a cross-sectional view of the first clamp body taken along line 11-11 in FIG. 5.
Figure 12:
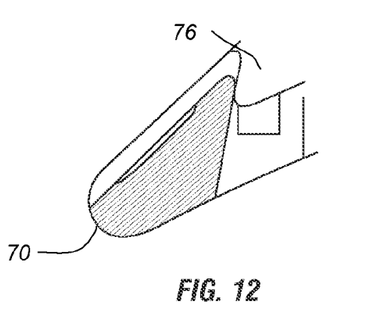
FIG. 12 is an enlargement of a side portion of the view shown in FIG. 11.

With reference now also to FIGS. 4-10, the first clamp 34 will be described. The first clamp 34 comprises an elongate clamp body 42 having a first end 44, a second end 46 and a mid-portion 48 therebetween, thereby defining a longitudinal axis represented by the line 50 (FIG. 5). The first clamp body 42 has a front face 54 (FIG. 5) and a rear face 56 (FIG. 6). As best seen in FIGS. 7-9, the rear face 56 is contoured or shaped to engage the mast arm 32 or other elongate support. Thus, where the support is a cylindrical mast arm 32, the rear face 56 defines a curve to receive the curved side of the mast arm. In this way, the rear face 56 aligns the first clamp body 42 so that its longitudinal axis 50 is parallel to the longitudinal axis "X" of the mast arm 32 (FIG. 1)

The first clamp 34 further comprises first, second, and third elongate connectors. As seen best in FIG. 3, the elongate connectors are flat, flexible, metal bands 62, 64, and 66. Each of the bands 62, 64, and 66 is sized to encircle the mast arm 32. The first band 62 is connectable to the first clamp body 42 near the first end 44, the second band 64 is connectable to the first clamp body 42 near its second end 46, and the third band 66 is connectable near the mid-portion 48.

The bands 62, 64, and 66 attach to the first clamp body 42 in a known manner, which will not be described in detail herein. Briefly, a first side 70 of the body 42 has recesses 74, 76 and 78 for receiving groove pins (not shown) placed through the looped ends of the bands 62, 64, and 66. The second side 80 has recesses 82, 84 and 86 for receiving clamp screws 88, 90 and 92 and tightening collars 94a, 96a, and 98a, and nuts 94b, 96b, and 98b (FIG. 4) for connecting the other end of the bands 62, 64, and 66 to the second side 80 and permit tightening of the bands.

With continuing reference to FIGS. 3-11, the first clamp body 42 preferably defines at least one wire access opening. More preferably, the body 42 defines first and second wire access openings 100 and 102. The access openings 100 and 102 are spaced along the length of the clamp body 42 so that the first access opening 100 is located between the recesses 74 and 82 for the first band 62 and the recesses 76 and 84 for the third band 66. Similarly, the second access opening 102 preferably is positioned between the recesses 76 and 84 for the third band 66 and the recesses 78 and 86 for the second band 64. The first clamp body 42 also is provided with multiple threaded bores 104, preferably two on each end 44 and 46, for receiving bolts 106 (FIG. 3).

Figure 13:
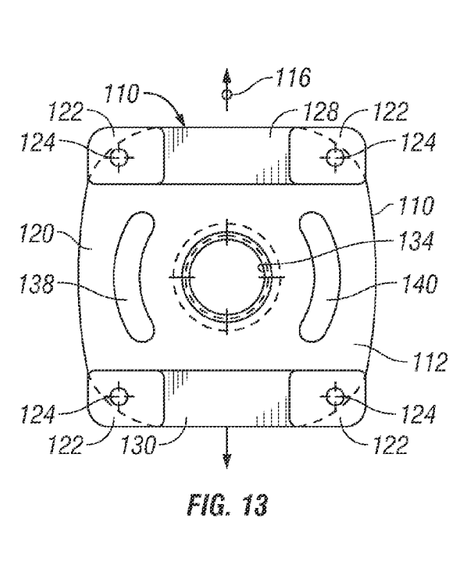
FIG. 13 is a front elevational view of the second clamp body.
Figure 14:
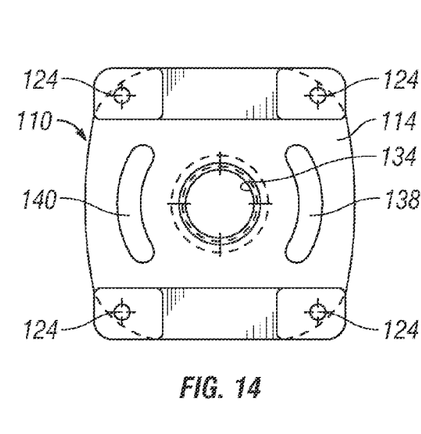
FIG. 14 is a rear elevational view of the second clamp body.

Referring still to FIG. 3 and now also to FIGS. 13-19, the second clamp 36 will be explained. The second clamp 36 generally comprises a second clamp body 110 with a front face 112 (FIG. 13) and a rear face 114 (FIG. 14) and defining a longitudinal axis represented by the arrow designated at 116 (FIG. 13). In the preferred form, the second clamp body 110 comprises a base portion 120 with four legs, all designated by reference numeral 122, that extend from the front face 112. Each of the legs 122 includes a threaded bore 124 for receiving bolts 126 (FIG. 3).

Figure 15:
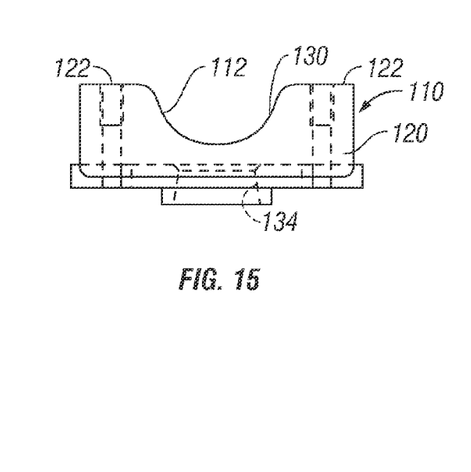
FIG. 15 is a bottom view of the second clamp body, the plan view being a mirror image thereof.
Figure 16:
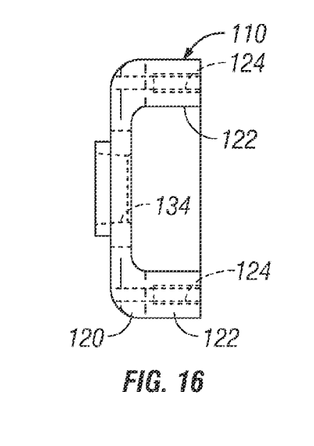
FIG. 16 is a side elevational view of the second clamp body, the opposite being the mirror image thereof.

As shown in FIGS. 3 and 15, the front face 112 is shaped to engage the pole 14 so that the longitudinal axis 116 of the second clamp body 110 is generally parallel to the longitudinal axis "Y" of the pole. While this configuration may be provided in several ways, in the preferred embodiment front face 112 defines a cradle formed by similar contours 128 and 130 between the legs on opposite sides of the body 10. The contours 128 and 130 are shaped to conform to the shape of one side of the pole 14. Specifically, the contours 128 and 130 are radiused to conform to the radius of the pole 14.

The base 120 of the second clamp body 110 is provided with a wire access opening 134. In addition, first and second arcuate slots 138 and 140 are formed in the base 120 of the clamp body 110, one on each side of the wire access opening 124. The purpose of these slots 138 and 140 will be explained below.

With reference to FIGS. 3 and 17-19, the second clamp 36 further comprises at least one and preferably two connectors sized to attach the second clamp body 110 to the pole 14 or other vertical support structure. Most preferably, the connectors are first and second saddle bars 144 and 146. As the saddle bars 144 and 146 are identical, only the saddle bar 144 will described.

Figures 17, 19:
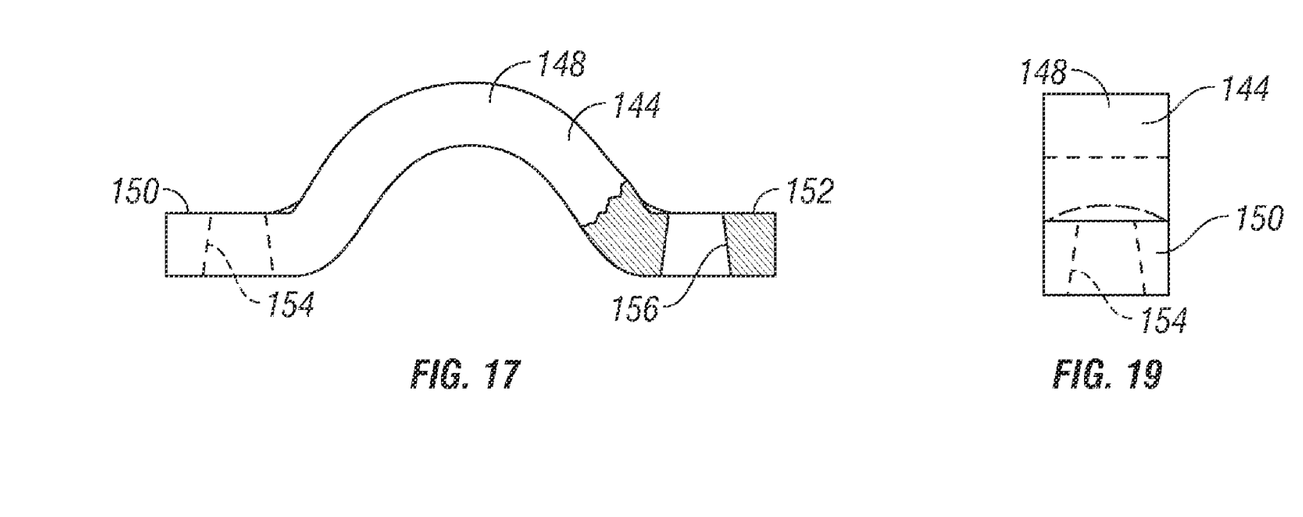
FIG. 17 is a partly sectional, side elevational view of a saddle connector forming part of the second clamp.
FIG. 19 is an end elevational view of the saddle connector.
Figure 18:
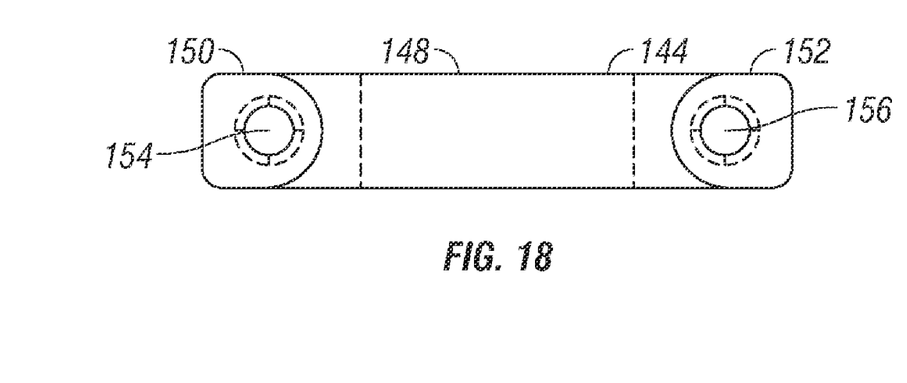
FIG. 18 is a rear elevational view of the saddle connector.
Figure 20:
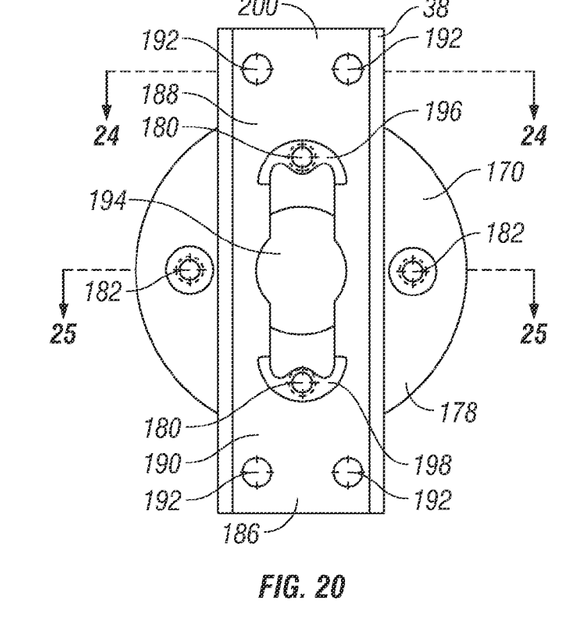
FIG. 20 is a rear elevational view of the adapter plate.
Figure 21:
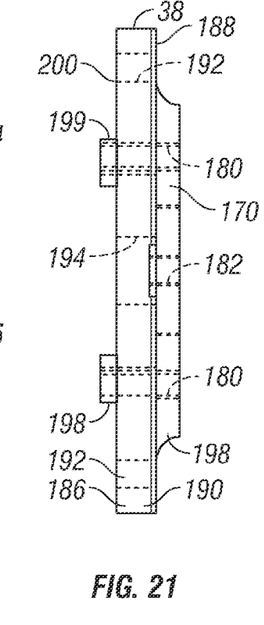
FIG. 21 is a side elevational view of the adapter plate.
Figure 22:
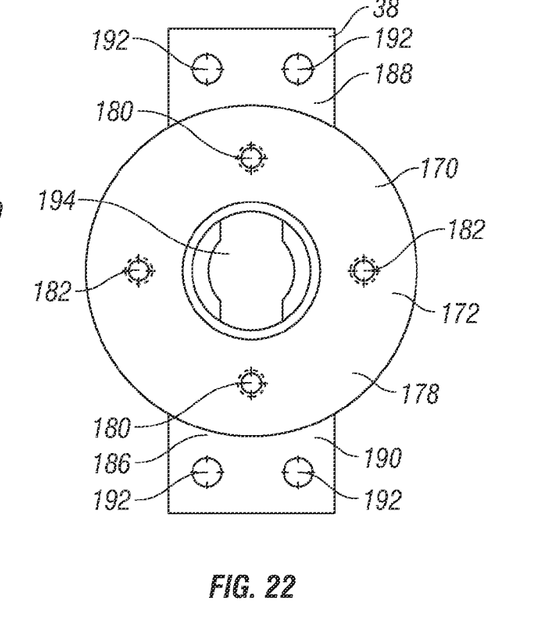
FIG. 22 is a front elevational view of the adapter plate.
Figure 23:
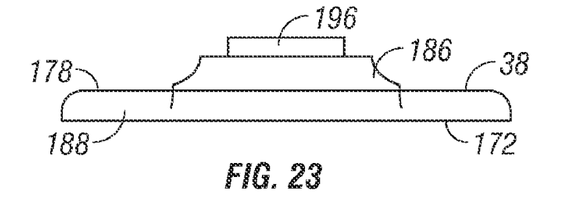
FIG. 23 is an end elevational view of the adapter plate.
Figure 24:
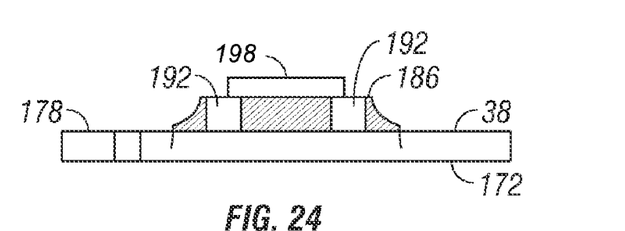
FIG. 24 is a cross-sectional view of the adapter plate taken along line 24-24 in FIG. 20.
Figure 25:
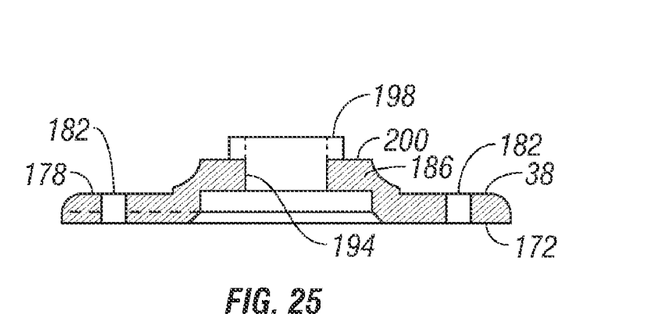
FIG. 25 is a cross-sectional view of the adapter plate taken along line 25-25 in FIG. 20.

The bar 144 comprises a curved center portion 148 flanked on each end by a foot 150 and 152. The center portion is radiused to conform to the shape of the side of the pole 14, and the feet are configured to mate with the ends of the legs 122 on the second clamp body 110. The feet 150 and 152 have bolt holes 154 and 156 to receive the bolts 126 (FIG. 3). As seen in FIGS. 17-19, the bolt holes 154 and 156 are tapered.

The preferred structure for the adapter plate 38 now will be described with reference to FIGS. 20-25. The adapter plate 38 is shaped to be interposed between the front face 54 of the first clamp body 42 and rear face 114 of the second clamp body 110 and is adapted to be adjustably attachable to the second clamp body.

Generally, the adapter plate 38 comprises a planar center portion 170 forming the front face 172 of the plate. The front face 172 of the plate 38 is adapted to engage the rear face 114 of the second clamp body 110. To that end, the plate 38 may comprise a circular panel 178 provided with first and second pairs 180 and 182 of opposing bolt holes. Each pair 180 and 182 of bolt holes is positioned to be alignable with the first and second arcuate slots 138 and 140 on the base 120 of the second clamp body 110. By means of the bolts 184 (FIG. 3) that extend through the slots 138 and 140 and one of the pairs 180 or 182 of the bolt holes in the plate 36, the second clamp body 110 is removably and adjustably attachable to the plate, as will be described more fully below. Radially extending serrations or teeth, or similar structures, may be provided on the opposing faces to provided additional resistance to rotational movement caused the torque or moment forces.

The adapter plate 38 also is removably attachable to the first clamp 34. To that end, adapter plate 38 may comprise a rectangular panel 186 immediately behind the circular panel 178. The size of the rectangular panel 186 is such that its ends extend as ears 188 and 190 laterally beyond the sides of the circular panel 178. The ears 188 and 190 are provided with bolt holes designated as 192 that are positioned to be alignable with the bolt holes 104 in the first clamp body 42. Thus, the bolts 106 (FIG. 2) attach the adapter plate 38 to the first clamp body 42.

With continuing reference to FIGS. 20-25, the adapter plate 38 preferably also includes a centrally disposed wire access opening 194. Additionally, the plate 38 may include one or more guides 196 and 198 that facilitate correct positioning of the plate on the first clamp body 42. In the embodiment shown herein, the guides 196 and 198 are arcuate members formed on the underside or rear face 200 of the rectangular panel 186. The outer edges of the guides 196 and 198 are radiused to generally conform to the internal radius of the wire access openings 100 and 102 in the first clamp body 42. Thus, when the guides 196 and 198 drop down inside the wire access openings 100 and 102, the adapter plate 38 is correctly positioned and will resist shifting from this position.

Figure 26:
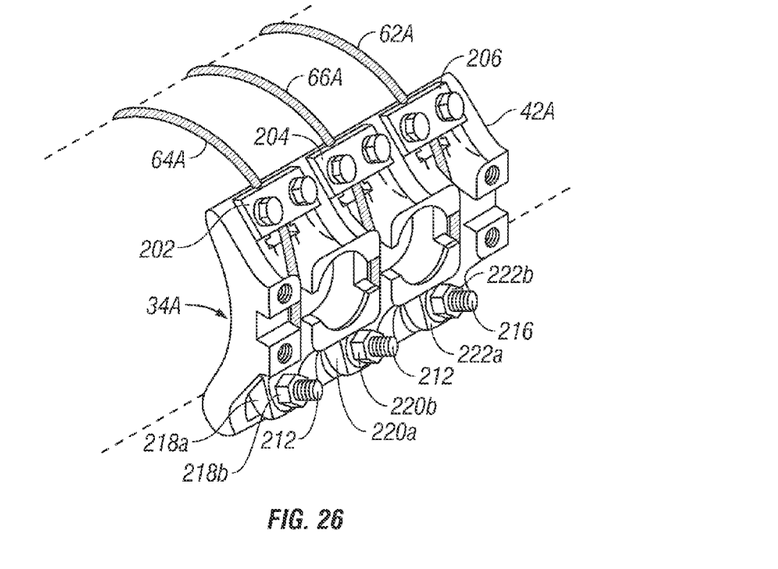
FIG. 26 is a perspective view of a second embodiment of the mounting clamp utilizing cable connectors instead of bands.
Figure 27:
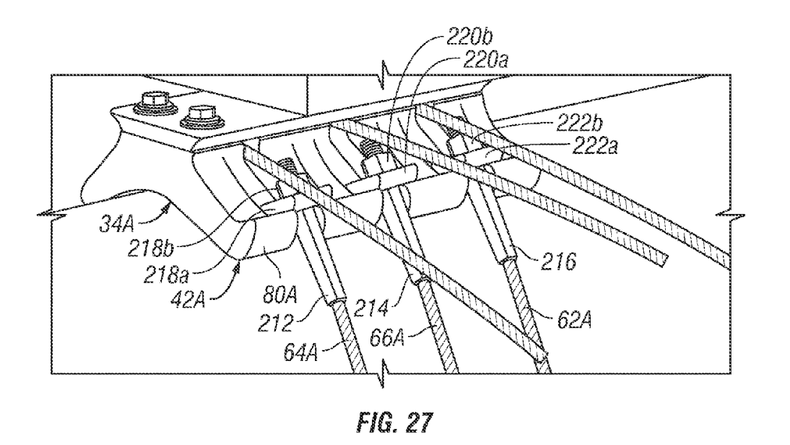
FIG. 27 is perspective view of the second side of the mounting clamp of FIG. 26 showing the cable screw and tightening collars and nuts.
Figure 28:
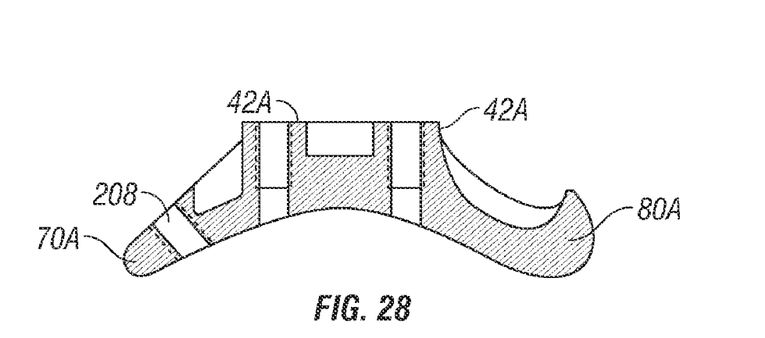
FIG. 28 is a cross-sectional view of the first clamp body of the mounting clamp of FIGS. 26 and 27 showing the screw holes in the first side of the clamp body.

Turning now to FIGS. 26-28, a second embodiment of the first clamp will be described and designated generally by the reference numeral 34A. In this embodiment, the first, second and third connectors in the first clamp 34A are metal cables 62A, 64A and 66A instead of flat bands. To attach the cables 62A, 64A and 66A, the first clamp 34A includes cable clamp plate and bolt assemblies 202, 204, and 206 (FIG. 26), and bolt holes 208 (FIG. 28) are machined in the first side 70A of the first clamp body 42A to receive the bolt assemblies. Additionally, instead of the band bolts 88, 90 and 92, used in the first embodiment, cable bolts 212, 214, and 216 are used to secure the ends of the cables 62A, 64A and 66A to the second side 80A of the clamp body 42 using tightening collars 218a, 220a and 222a and nuts 218b, 220b and 222b to permit tightening of the cables.

Now the various elements and structures of the mounting bracket 30 have been described, the assembly and operation of the bracket will be explained. First the desired elongate support is identified. For example, if a mast arm 32 is the support, the orientation of the first clamp 34 and the adapter plate 38 is generally horizontal. On the other, if the first elongate support is a vertical pole, then the orientation of the first clamp 34 and adapter plate 38 will be vertical as well. The first clamp body 42 is attached to the mast arm 32 using the bands 62, 64 and 66 (or cables 62A, 64A and 66a).

Next, the second clamp 36 is attached to the adapter plate 38. Where the orientation of the first clamp 34 and the adapter plate 38 is generally horizontal, the second clamp 36 will be attached by bolting the arcuate slots 138 and 140 to the holes 180. However, where the orientation is vertical, the slots will be bolted to the holes 182. (See FIGS. 20-22)

Next, the adapter plate 38, with the second clamp 36 attached, is bolted to the first clamp 34 with the bolts 106. Since most mast arms are not perfectly level but rather extend at a slight angle to level, the second clamp should be adjusted to plumb. To do this, the bolts 184 are loosened slightly, and the second clamp body 110 is rotated to the left or the right until plumb is achieved. Then, the bolts 182 are retightened.

Now, the vertical pole 14 is attached to the second clamp 36 using the saddles 144 and 146 and the bolts 126. The camera 12 in its bracket 18 is next positioned on top of the pole 14 using the adapter 20, and the view angle of the camera is adjusted as desired.

Where appropriate wiring may be supplied through the mast arm 32, through the bracket 30 and up through the pole 14 to the camera 12 or other device. Now it will be apparent that the wire access opening 134 in the second clamp body 110 aligns with the wire access opening 194 in the adapter plate 38, and that these are in continuous with both wire access openings 100 and 102 in the first clamp body 42. The opening used, 100 or 102, usually will depend on the direction the wiring will be going relative to the bracket 30.

Now it will be understood that the arcuate slots 138 and 140 in the second clamp body 110 in combination with the alternate pairs of bolts holes 180 and 183 in the adapter plate 38 allow 180 degrees of rotation of the second clamp 36 relative to the first clamp 34. This allows the mounting bracket to provide perfectly vertical support for the pole 14 irrespective of the angle of the mast arm 32 or other support. Moreover, the adjustment of the second bracket to plumb is done easily in the field, without disassembling the bracket 30.

Although not shown in the drawings, it will be appreciated that the arcuate slots could be provided in the adapter plate and the alternate pairs of bolt holes in the second clamp body. These and other variations and changes in the embodiments described are within the scope of the present invention.

Now it will be appreciated that the mounting bracket and mounting assembly of the present invention provides a sturdy structure for mounting a camera or other traffic control device. The adapter allows the conventional camera bracket to be mounted atop a pole that is at least 2 inches in diameter, that is, on a pole that is stronger and larger than the pole for which convention traffic camera brackets are designed to fit. In addition, the first clamp in the mounting bracket configured with three bands or cables. This three point mounting provides greater strength that is possible with a two point mounting bracket. The use of the 2+inch pole and the three point attachment clamp permits devices, such as cameras, to be supported 10-15 feet above the mast arm or other support. Still further, the adapter plate allows one clamp in the two clamp bracket assembly to be rotated a complete 180 degrees relative to the other clamp providing excellent versatility.

The embodiments shown and described above are exemplary. Many details are often found in the art and, therefore, many such details are neither shown nor described. It is not claimed that all of the details, parts, elements, or steps described and shown were invented herein. Even though numerous characteristics and advantages of the present invention have been described in the drawings and accompanying text, the description is illustrative only. Changes may be made in the details, especially in matters of shape, size, and arrangement of the parts within the principles of the invention to the full extent indicated by the broad meaning of the terms of the attached claims. The description and drawings of the specific embodiments herein do not point out what an infringement of this patent would be, but rather provide an example of how to use and make the inventions. The limits of the inventions and the bounds of the patent protection are measured by and defined in the following claims.

What is claimed is:

1. A mounting bracket for mounting a traffic control device to a first elongate support having a longitudinal axis, wherein the traffic control device comprises a second elongate support having a longitudinal axis, the mounting bracket comprising:
   a first clamp removably attachable to the first support, the first clamp comprising:
      a first clamp body having a longitudinal axis, a first end, a second end, and a mid-portion therebetween, wherein the first clamp body comprises a front face and rear face, the rear face shaped to engage the first elongate support longitudinally so that the longitudinal axis of the first clamp body is generally parallel to the longitudinal axis of the first elongate support; and
      first, second, and third elongate connectors, each sized to encircle the first support, the first connectable to the first clamp body near the first end, the second connector connectable to the first clamp body near the second end, and the third connector connectable to the first clamp body on the mid-portion;
   a second clamp removably attachable to the second elongate support, the second clamp comprising:
      a second clamp body having a longitudinal axis and comprising a front face and a rear face, wherein the front face is shaped to engage the second support longitudinally so that the longitudinal axis of the second clamp body is generally parallel to the longitudinal axis of the first elongate support;

at least one connector sized to attach the second clamp body to the second support;

an adapter plate interposable between the front face of the first clamp body and the rear face of the second clamp body, wherein the adapter plate is attachable to the first clamp body and the second clamp body, wherein the adapter plate is adjustably attachable to at least one of the first clamp body and second clamp body so that the second clamp body can be rotated relative to the first clamp body at least about 90 degrees.

2. The mounting bracket of claim 1 wherein the connectors of the first clamp comprise flat, flexible metal bands.

3. The mounting bracket of claim 1 wherein the connectors of the first clamp comprise flat, flexible metal cables.

4. The mounting bracket of claim 1 wherein the first clamp body defines at least one wire access opening, wherein the second clamp body and the adapter plate each comprises a wire access opening, and wherein, when the bracket is assembled, the wire access openings in the first clamp body, the adapter plate, and the second clamp body are continuous so that wiring can extend from through the bracket and into the second support.

5. The mounting bracket of claim 4 wherein the at least one wire access opening in the first clamp body comprises first and second access openings, the first access opening located between the first and second connector and the second access opening located between the second and third connector.

6. The mounting bracket of claim 1 wherein the second clamp is adapted to clamp around a second elongate support having a diameter of at least about two inches.

7. The mounting bracket of claim 6 wherein second clamp body defines a cradle portion contoured to conform to the shape of one side of the second elongate support, and wherein the at least one connector of the second clamp comprises first and second saddle bars, each having a center portion contoured to fit around the other side of the second elongate support and opposing ends connectable to the second clamp body on each side of the pipe.

8. The mounting bracket of claim 1 wherein second clamp body defines a cradle portion contoured to conform to the shape of one side of the second elongate support, and wherein the at least one connector of the second clamp comprises first and second saddle bars, each having a center portion contoured to fit around the other side of the second elongate support and opposing ends connectable to the second clamp body on each side of the pipe.

9. The mounting bracket of claim 1 wherein the adapter plate is adjustably attachable to the second clamp body.

10. The mounting bracket of claim 9 wherein the bracket further comprises a plurality of bolts, wherein the adapter plate comprises a planar center portion and first and second ears extending laterally on opposite sides of the center portion, wherein the center portion includes first and second pairs of opposing bolt holes, each bolt hole sized to receive one of the plurality of bolts, wherein each of the ears on the adapter plate has at least one bolt hole, wherein the first clamp body comprises at least one bolt hole on each of the first and second ends positioned to align with the bolt holes in the ears of the adapter plate whereby the ears of the adapter plate are removably attachable to the first clamp body, wherein the second clamp body defines first and second arcuate slots, each slot shaped to receive one of the plurality of bolts, and wherein the first and second slots are position to be aligned alternately with either one of the first and second pairs of bolt holes in the center portion of the adapter plate whereby the second clamp body is adjustable attachable to the adapter plate.

11. The mounting bracket of claim 10 wherein the arcuate slots in the second clamp body and the bolt holes in the center portion of the adapter plate are configured to permit rotation of the second clamp body at least about 180 degrees relative to the first clamp body.

12. The mounting bracket of claim 1 wherein the second clamp body is rotatable at least about 180 degrees relative to the first clamp body.

13. A mounting assembly supporting a traffic control device above an elongate support having a longitudinal axis, the mounting assembly comprising:

a support pole having first and second ends and a diameter of at least about 2 inches;

a device bracket mounted to the first end of the support pole and adapted to adjustably support the traffic control device;

a mounting bracket attachable to the elongate support, the mounting bracket comprising:

a first clamp removably attachable to the elongate support, the first clamp comprising:

a first clamp body having a longitudinal axis, a first end, a second end, and a mid-portion therebetween, wherein the first clamp body comprises a front face and rear face, the rear face shaped to engage the elongate support longitudinally so that the longitudinal axis of the first clamp body is generally parallel to the longitudinal axis of the elongate support; and first, second, and third elongate connectors, each sized to encircle the elongate support, the first connector connectable to the first clamp body near the first end, the second connector connectable to the first clamp body near the second end, and the third connector connectable to the first clamp body on the mid-portion;

a second clamp removably attachable to the second end of the support pole, the second clamp comprising:

a second clamp body having a longitudinal axis and comprising a front face and a rear face, wherein the front face is shaped to engage the second support longitudinally so that the longitudinal axis of the second clamp body is generally parallel to the longitudinal axis of the elongate support;

at least one connector sized to attach the second clamp body to the support pole;

an adapter plate interposable between the front face of the first clamp body and the rear face of the second clamp body, wherein the adapter plate is attachable to the first clamp body and the second clamp body, wherein the adapter plate is adjustably attachable to at least one of the first clamp body and second clamp body so that the second clamp body can be rotated relative to the first clamp body at least about 90 degrees.

14. The mounting assembly of claim 13 wherein the connectors of the first clamp comprise flat, flexible metal bands.

15. The mounting assembly of claim 13 wherein the connectors of the first clamp comprise flat, flexible metal cables.

16. The mounting assembly of claim 13 wherein the first clamp body defines at least one wire access opening, wherein the second clamp body and the adapter plate each comprises a wire access opening, and wherein, when the bracket is assembled, the wire access openings in the first clamp body, the adapter plate, and the second clamp body are continuous so that wiring can extend from through the bracket and into the second support.

17. The mounting assembly of claim 16 wherein the at least one wire access opening in the first clamp body comprises first and second access openings, the first access opening located between the first and second connector and the second access opening located between the second and third connector.

18. The mounting assembly of claim 13 wherein the second clamp is adapted to clamp around a second elongate support having a diameter of at least about two inches.

19. The mounting assembly of claim 18 wherein second clamp body defines a cradle portion contoured to conform to the shape of one side of the second elongate support, and wherein the at least one connector of the second clamp comprises first and second saddle bars, each having a center portion contoured to fit around the other side of the second elongate support and opposing ends connectable to the second clamp body on each side of the pipe.

20. The mounting assembly of claim 13 wherein second clamp body defines a cradle portion contoured to conform to the shape of one side of the second elongate support, and wherein the at least one connector of the second clamp comprises first and second saddle bars, each having a center portion contoured to fit around the other side of the second elongate support and opposing ends connectable to the second clamp body on each side of the pipe.

21. The mounting assembly of claim 13 wherein the adapter plate is adjustably attachable to the second clamp body.

22. The mounting assembly of claim 21 wherein the bracket further comprises a plurality of bolts, wherein the adapter plate comprises a planar center portion and first and second ears extending laterally on opposite sides of the center portion, wherein the center portion includes first and second pairs of opposing bolt holes, each bolt hole sized to receive one of the plurality of bolts, wherein each of the ears on the adapter plate has at least one bolt hole, wherein the first clamp body comprises at least one bolt hole on each of the first and second ends positioned to align with the bolt holes in the ears of the adapter plate whereby the ears of the adapter plate are removably attachable to the first clamp body, wherein the second clamp body defines first and second arcuate slots, each slot shaped to receive one of the plurality of bolts, and wherein the first and second slots are position to be aligned alternately with either one of the first and second pairs of bolt holes in the center portion of the adapter plate whereby the second clamp body is adjustable attachable to the adapter plate.

23. The mounting assembly of claim 22 wherein the arcuate slots in the second clamp body and the bolt holes in the center portion of the adapter plate are configured to permit rotation of the second clamp body at least about 180 degrees relative to the first clamp body.

24. The mounting assembly of claim 13 wherein the second clamp body is rotatable at least about 180 degrees relative to the first clamp body.

25. The mounting assembly of claim 13 wherein the support pole is at least about 6 feet long.

26. The mounting assembly of claim 25 wherein the support pole is at least about 10 feet long.

27. The mounting assembly of claim 13 wherein the traffic control device is a traffic camera, wherein the device bracket comprises a standard camera bracket that supports the camera for rotation in both a vertical axis and a horizontal axis, and wherein the mounting assembly further comprises an adapter for attaching the camera bracket to the support pole.

28. The mounting assembly of claim 13 wherein the device bracket supports the traffic control device for rotation in both a vertical axis and a horizontal axis.

* * * * *